United States Patent
Lee et al.

(10) Patent No.: US 11,494,113 B2
(45) Date of Patent: Nov. 8, 2022

(54) COMPUTER PROGRAM PRODUCT AND METHOD AND APPARATUS FOR SCHEDULING EXECUTION OF HOST COMMANDS

(71) Applicant: Silicon Motion, Inc., Zhubei (TW)

(72) Inventors: Shou-Wei Lee, New Taipei (TW); Chun-Chieh Kuo, Taipei (TW); Hsueh-Chun Fu, Hsinchu County (TW)

(73) Assignee: SILICON MOTION, INC., Zhubei (TW)

( * ) Notice: Subject to any disclaimer, the term of this patent is extended or adjusted under 35 U.S.C. 154(b) by 147 days.

(21) Appl. No.: 17/122,588

(22) Filed: Dec. 15, 2020

(65) Prior Publication Data

US 2021/0389904 A1 Dec. 16, 2021

(30) Foreign Application Priority Data

Jun. 10, 2020 (CN) .......................... 202010524205.5

(51) Int. Cl.
*G06F 3/06* (2006.01)
(52) U.S. Cl.
CPC .......... *G06F 3/0655* (2013.01); *G06F 3/0604* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | |
|---|---|---|
| 2014/0013041 A1 | 1/2014 | Gillingham |
| 2015/0095605 A1* | 4/2015 | Roberts .................. G06F 3/0659 |
| | | 711/167 |
| 2017/0075570 A1 | 3/2017 | Yoon et al. |
| 2917/9109096 | 4/2017 | Jean et al. |
| 2019/0294373 A1 | 9/2019 | Lee et al. |
| 2020/0301615 A1* | 9/2020 | Keil ..................... G06F 13/1673 |

FOREIGN PATENT DOCUMENTS

WO   WO 2019/172971 A1   9/2019

OTHER PUBLICATIONS

Taiwanese Search Report for Taiwanese Application No. 109119399, dated Aug. 10, 2021.

\* cited by examiner

*Primary Examiner* — Jane Wei
(74) *Attorney, Agent, or Firm* — Birch, Stewart, Kolasch & Birch, LLP

(57) ABSTRACT

The invention introduces a non-transitory computer program product for scheduling execution of host commands when executed by a processing unit of a flash controller. Space of a random access memory of the flash controller is allocated for a first queue and a second queue, and the first queue stores the host commands issued by a host side in an order of time when the host commands arrive to the flash controller. The non-transitory computer program product includes program code to: migrate one or more host write commands from the top of the first queue to the second queue in an order of time when the host write commands arrive to the flash controller until the top of the first queue stores a host read command; fetch the host read command from the top of the first queue; execute the host read command to read user data from a flash module; and reply to the host side with the user data.

20 Claims, 7 Drawing Sheets ered to be executed for a garbage collection (GC) process. When the arrival time of one or more host read commands are later than host write commands for a large file, and/or the controller read and write instructions for a GC process, the execution of the host read commands needs to wait for the execution of the previous commands. However, the host read commands may be issued to read user data that is necessary to open an application by the host side. Failure to reply with the user data to the host side in time will result in the application to open not smooth, causing users to consider that the performance of Solid State Disk (SSD) products is bad. Thus, it is desirable to have a computer program product, a method and an apparatus for scheduling the execution of host commands to address the aforementioned problems.

COMPUTER PROGRAM PRODUCT AND METHOD AND APPARATUS FOR SCHEDULING EXECUTION OF HOST COMMANDS

CROSS-REFERENCE TO RELATED APPLICATIONS

This application claims the benefit of priority to Patent Application No. 202010524205.5, filed in China on Jun. 10, 2020; the entirety of which is incorporated herein by reference for all purposes.

BACKGROUND

The disclosure generally relates to storage devices and, more particularly, to a computer program product, a method and an apparatus for scheduling the execution of host commands.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

Regularly, a flash controller executes the host commands, such as host read, write and erase commands, etc., in the First-In First-Out (FIFO) principle to read user data from designated addresses of flash units, program user data into designated addresses of flash units, and erase designated physical blocks of flash units. Moreover, to increase the space usage of the flash units, the flash controller may actively arrange controller read and write instructions that required to be executed for a garbage collection (GC) process. When the arrival time of one or more host read commands are later than host write commands for a large file, and/or the controller read and write instructions for a GC process, the execution of the host read commands needs to wait for the execution of the previous commands. However, the host read commands may be issued to read user data that is necessary to open an application by the host side. Failure to reply with the user data to the host side in time will result in the application to open not smooth, causing users to consider that the performance of Solid State Disk (SSD) products is bad. Thus, it is desirable to have a computer program product, a method and an apparatus for scheduling the execution of host commands to address the aforementioned problems.

SUMMARY

In an aspect of the invention, an embodiment introduces a non-transitory computer program product for scheduling executions of host commands when executed by a processing unit of a flash controller. Space of a random access memory (RAM) of the flash controller is allocated for a first queue and a second queue, and the first queue stores the host commands issued by a host side in an order of time when the host commands arrive to the flash controller. The non-transitory computer program product includes program code to: migrate one or more host write commands from the top of the first queue to the second queue in an order of time when the host write commands arrive to the flash controller until the top of the first queue stores a host read command; fetch the host read command from the top of the first queue; execute the host read command to read user data from a flash module; and reply to the host side with the user data.

In another aspect of the invention, an embodiment introduces a method for scheduling executions of host commands, performed by a flash controller. Space of a RAM of the flash controller is allocated for a first queue and a second queue, and the first queue stores the host commands issued by a host side in an order of time when the host commands arrive to the flash controller. The method includes: migrating one or more host write commands from the top of the first queue to the second queue in an order of time when the host write commands arrive to the flash controller until the top of the first queue stores a host read command; fetching the host read command from the top of the first queue; executing the host read command to read user data from a flash module; and replying to the host side with the user data.

In still another aspect of the invention, an embodiment introduces an apparatus for scheduling executions of host commands, at least including: a RAM; a flash interface (I/F), coupled to a flash module; a host I/F, coupled to a host side; and a processing unit, coupled to the RAM, the flash I/F and the host I/F. The RAM is arranged operably to allocate space for a first queue and a second queue, wherein the first queue stores the host commands issued by the host side in an order of time when the host commands arrive to a flash controller. The processing unit is arranged operably to migrate one or more host write commands from the top of the first queue to the second queue in an order of time when the host write commands arrive to the flash controller until the top of the first queue stores a host read command; fetch the host read command from the top of the first queue; execute the host read command to drive the flash I/F to read user data from the flash module; and drive the host I/F to reply to the host side with the read user data.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
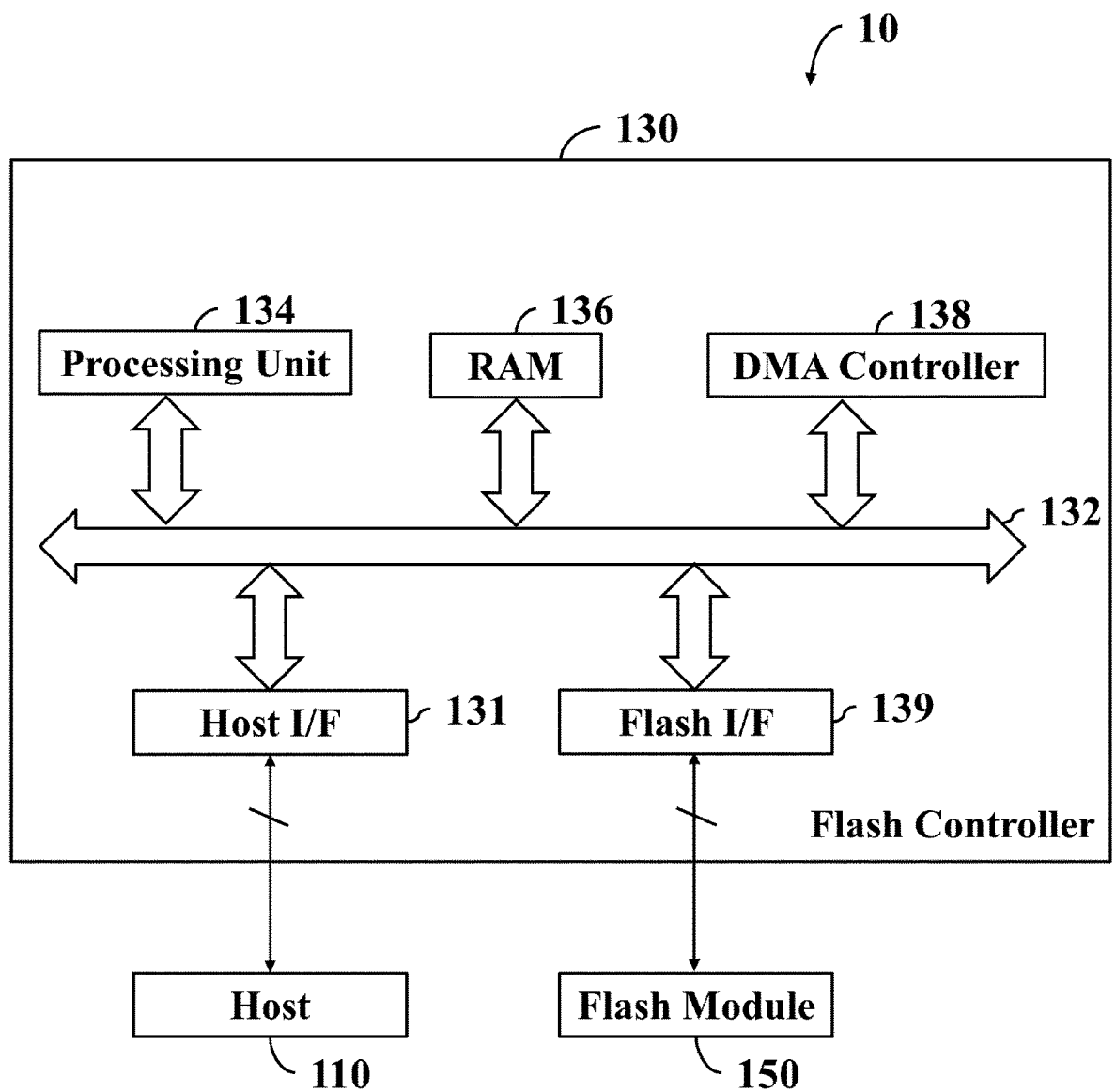
FIG. 1 is the system architecture of an electronic apparatus according to an embodiment of the invention.

Refer to FIG. 1. The electronic apparatus 100 includes a host side 110, a flash controller 130 and a flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, or other consumer electronic products. The host 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Non-Volatile Memory Express (NVMe), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 may receive host commands from the host side 110 through the host I/F 131, such as read commands, write commands, erase commands, etc., schedule and execute the host commands. The flash controller 130 includes the Random Access Memory (RAM) 135, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-to-flash (H2F) tables, flash-to-host (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136, the direct memory access (DMA) controller 138 and the flash I/F 139. The DMA controller 138 moves data between the components through the bus architecture 132 according to the instructions issued by the processing unit 134. For example, the DMA controller 138 may migrate data in a specific data buffer of the host I/F 131 or the flash I/F 139 to a specific address of the RAM 136, migrate data in a specific address of the RAM 136 to a specific data buffer of the host I/F 131 or the flash I/F 139, and so on.

The flash module 150 provides huge storage space typically in hundred Gigabytes (GBs), or even several Terabytes (TBs), for storing a wide range of user data, such as high-resolution images, video files, etc. The flash module 150 includes control circuits and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
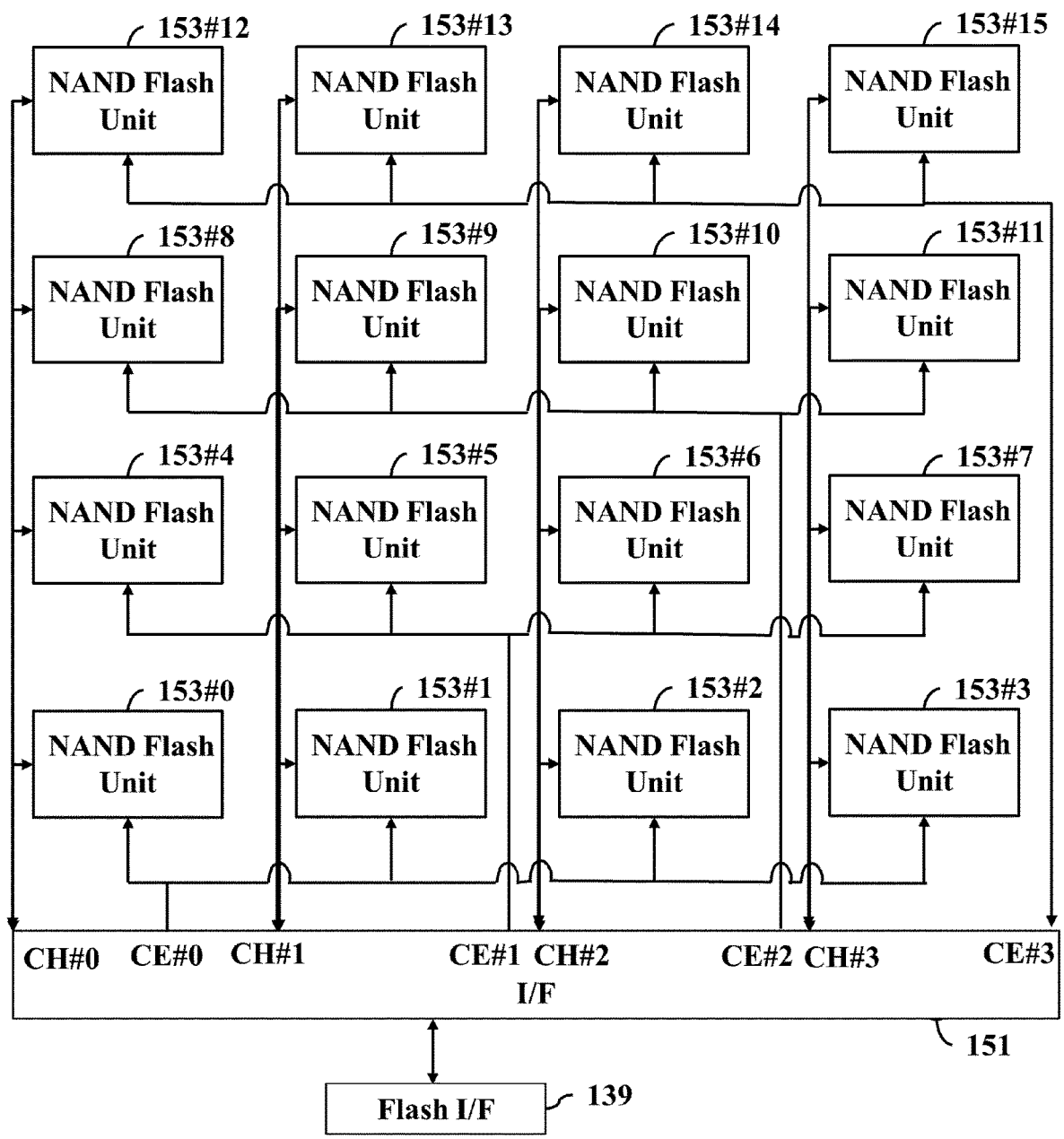
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash modules, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash modules 153 #0 to 153 #3, the NAND flash modules 153 #4 to 153 #7, the NAND flash modules 153 #8 to 153 #11, or the NAND flash modules 153 #12 to 153 #15, and read data from or program data into the activated NAND flash modules in parallel.

Figure 3:
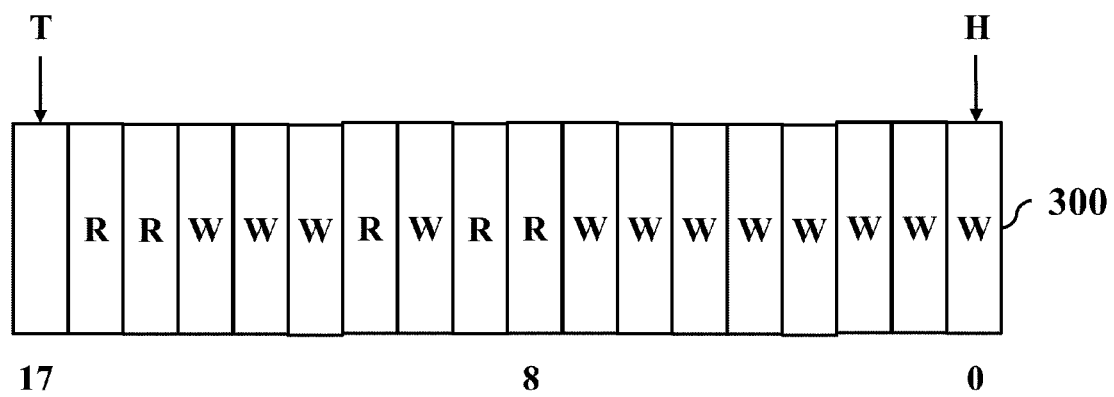
FIG. 3 is a schematic diagram of a native command queue according to some implementations.

In some implementations, certain space of the RAM 136 is allocated for a native command queue (NCQ) to store the commands, such as host read, write, erase commands, etc., issued by the host side 110 in the order of the time when the commands arrive to the flash controller 130. Refer to FIG. 3. The NCQ 300 contains a collection of entries. Each entry of the NCQ 300 may store one host command, such as a host read command (represented by a notation "R"), a host write command (represented by a notation "W"), etc. The principle operations on the NCQ 300 are the addition of entities to the rear terminal position (for example, the position pointed by a pointer "T"), known as enqueue, and removal of entities from the front terminal position (for example, the position pointed by a pointer "H"), known as dequeue. That is, the first command added to the NCQ 300 will be the first one to be removed, which conforms to the First-In First-Out (FIFO) principle. The host read command in the $8^{th}$ entry has to wait for the $0^{th}$ to $7^{th}$ host write commands to be executed before execution. However, the host read command may be issued by the host side 110 to read user data from a designated address when an application is launched, and the execution of previous eight host write commands may take a relative long time for programming data. In this way, the user data that host read command wants to obtain cannot be replied to the host side 110 in time, causing the application not to be opened smoothly, and even worse, making users consider of the bad performance of Solid State Disk (SSD) products.

Figure 4:
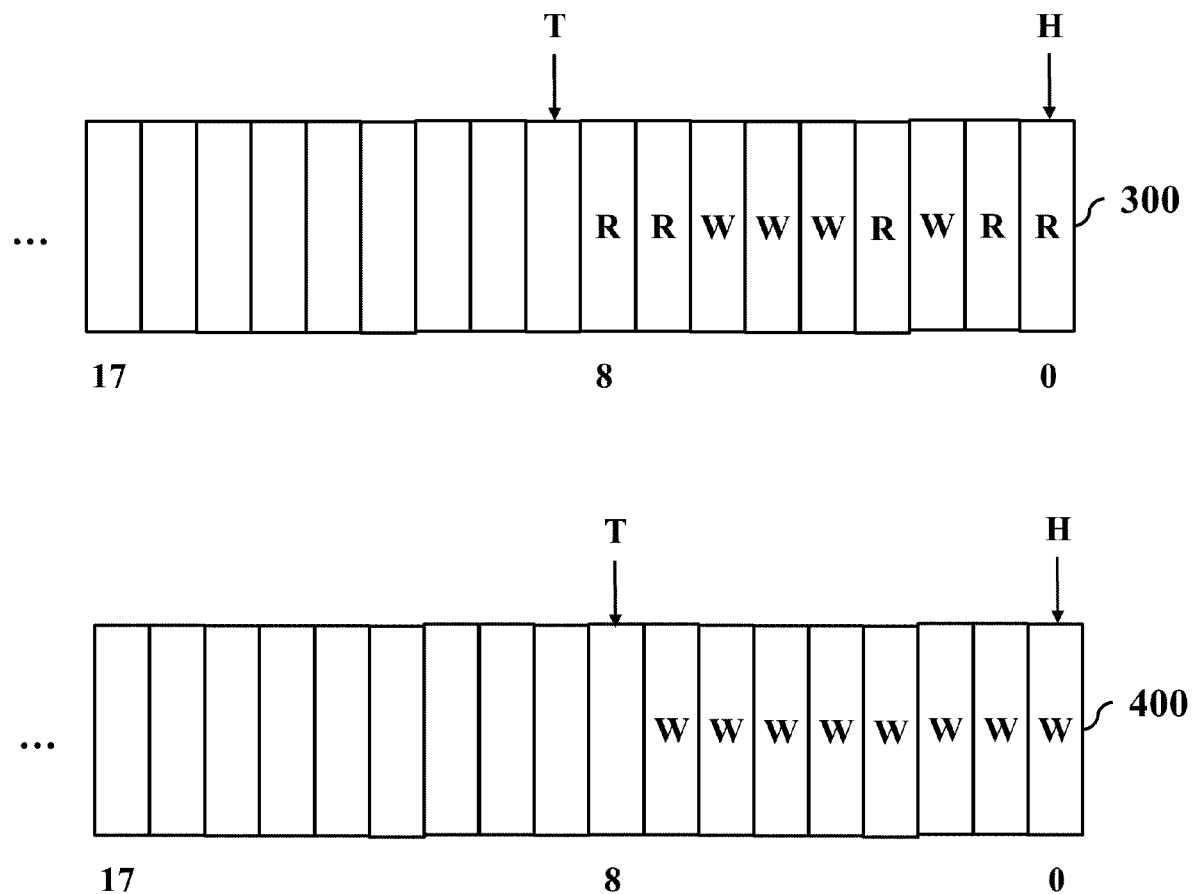
FIG. 4 is a schematic diagram of a native command queue and a native command queue-write according to an embodiment of the invention.

To address the problems as described above, an embodiment of the invention introduces a scheduling mechanism for host commands, which would be used to prevent host read commands from being fetched and executed too late due to the execution of host write commands for long data programming. In regular situations, the new scheduling mechanism allows host read commands to have higher priorities than the host write commands, so that the flash controller 130 preferentially serves the host read commands. Refer to FIG. 4. In addition to the NCQ 300, certain space of the RAM 136 is allocated for the native command queue-write (NCQ-W) 400 to store host write commands that are moved from the NCQ 300 in the order of the time when the host write commands arrive to the flash controller 130. In other words, the NCQ-W 400 is configured to store the host write commands for requesting the flash controller 130 to program designated user data into the flash module 150 only. For example, since, as shown in FIG. 3, the NCQ 300 stores the two host read command following the host write commands of the $0^{th}$ to $7^{th}$ entries, the new scheduling mechanism moves the host write commands of the $0^{th}$ to $7^{th}$ entries in the NCQ 300 to the NCQ-W 400. The moving results are shown in FIG. 4 and the processing unit 134 fetches the host read commands of the $0^{th}$ to the $1^{st}$ entries from the NCQ 300 and executes first. Specifically, the processing unit 134 drives the flash I/F 139 to read user data from the flash module 150 according to the information carried in the $0^{th}$ to the $1^{st}$ host read commands and drives the host I/F 131 to replied to the host side 110 with the read user data. Those artisans may realize the depth D2 of the NCQ-W 400 shorter than the depth D1 of the NCQ 300. For example, when D1 is 20, 32, 64, D2 may be set to 10, 16, 32, respectively. Through the configuration of NCQ 300 and NCQ-W 400 with the scheduling mechanism as described above, it would avoid that the user data that the host read command wants to obtain cannot be replied to the host side 110 in time due to the long data programming, causing an application not to be launched smoothly.

Figure 5:
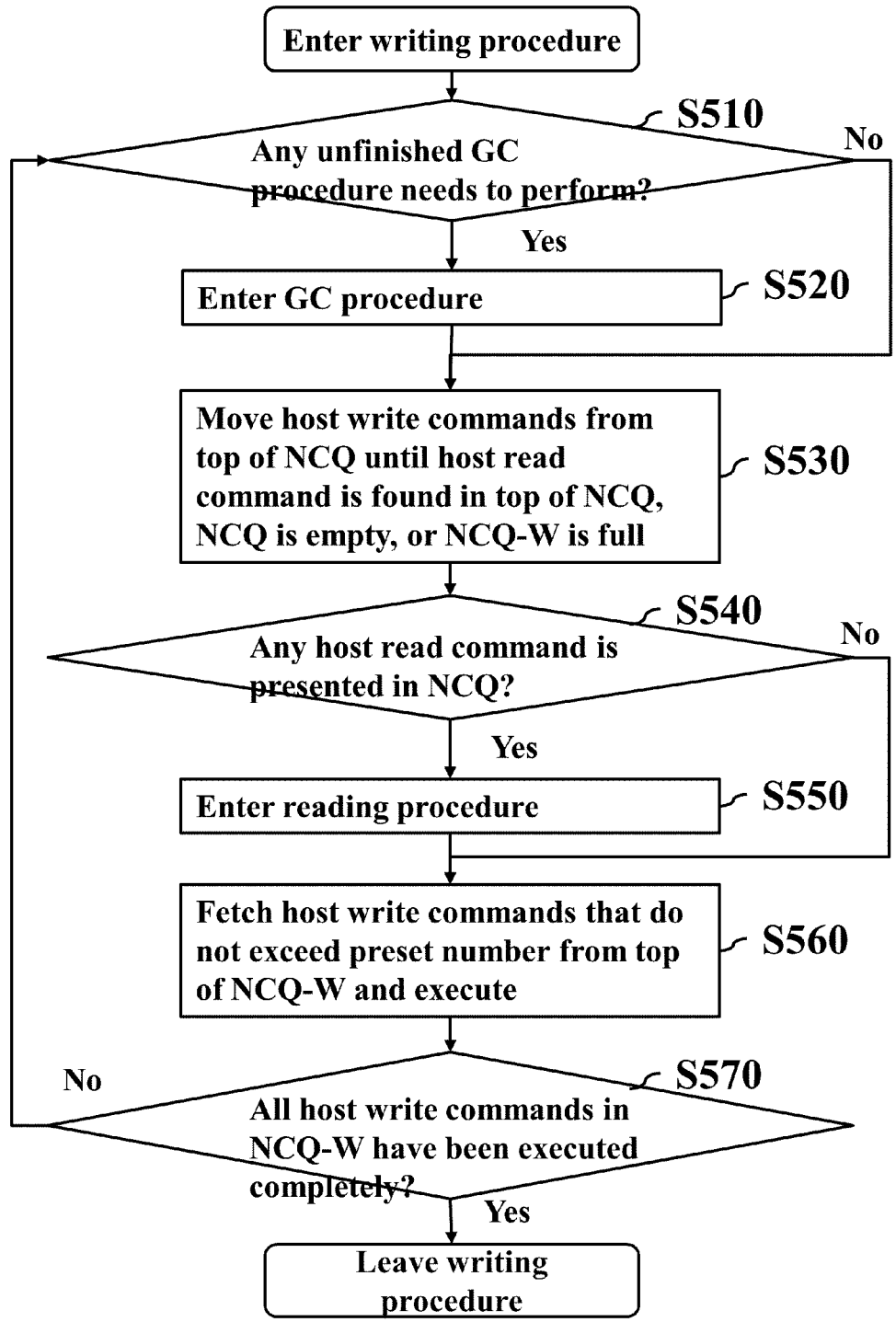
FIG. 5 is a flowchart illustrating a method for a writing procedure according to an embodiment of the invention.

In order to enable the host read commands to be executed as soon as possible, the processing unit 134 when loading and executing relevant firmware and/or software instructions migrates the host write commands from the NCQ 300 to the NCQ-W 400 and detects whether any host read command is presented in the NCQ 300 at specific time points. Details are described as follows:

Refer to FIG. 5. In order to implement the aforementioned scheduling mechanism, an embodiment of the invention introduces a writing procedure performed by the processing unit 134 when loading and executing relevant firmware and/or software instructions. In the writing procedure, the processing unit 134 fetches and executes host write commands in batches. In each batch, the processing unit 134 fetches and executes no more than the preset number of host write commands to prevent the execution of host write commands from hindering an unfinished garbage collection (GC) procedure and/or causing the execution of host read command to time out. In each batch, if there is an unfinished GC procedure, the processing unit 134 performs the unfinished GC procedure for a predefined period of time first, and then fetches and executes the host write commands that do not exceed the preset number in the NCQ-W 400. Additionally, if there is any host read command in the NCQ 300, the processing unit 134 executes the host read command first, and then fetches and executes the host write commands that do not exceed the preset number in the NCQ-W 400.

When the number of spare blocks in the flash module 150 is less than a threshold, the flash controller 130 needs to spend time to perform the GC procedure to prevent the flash module 150 from being unable to program data due to insufficient available space. Specifically, the processing unit 134 drives the flash I/F 139 to collect fragmentary valid user data of multiple physical blocks in the flash module 150 and program the collected user data into one or more new physical blocks, so that the released physical blocks after being erased can be used by other user data.

Detailed steps of FIG. 5 are described as follows:

Step S510: It is determined whether there is an unfinished GC procedure. If so, the process proceeds to step S520; otherwise, the process proceeds to step S530. It is noted that, in some cases, if the GC procedure is not performed first to release more available space, it may cause insufficient space that the host write command cannot be executed successfully. The processing unit 134 may record a public variable in the RAM 136 during the performance of the GC procedure, which is used to indicate the time (also referred to as the remaining time) still required by the GC procedure. The processing unit 134 may determine whether there is an unfinished GC procedure according to the public variable. If the value of the public variable is greater than 0, there is an unfinished GC procedure needs to perform. If that equals 0, no GC procedure needs to perform.

Step S520: The GC procedure is entered. Technical details of the GC procedure will be described in the following paragraphs accompanying with FIG. 6. It is noted that when the execution leaves the GC procedure, it will return to the writing procedure to proceed to step S530.

Step S530: One or more host write commands are moved from the top of the NCQ 300 to the NCQ-W 400 until a host read command is found at the top of NCQ 300, the NCQ 300 is empty, or the NCQ-W 400 is full. The processing unit 134 may repeatedly execute a loop until one of the above conditions is satisfied. In each iteration, the processing unit 134 inspects whether each condition is satisfied first. When all the conditions are not satisfied, one host write command is migrated from the top of the NCQ 300 to the bottom of the NCQ-W 400.

Step S540: It is determined whether any host read command is presented in the NCQ 300. If so, the process proceeds to step S550; otherwise, the process proceeds to step S560.

Figure 7:
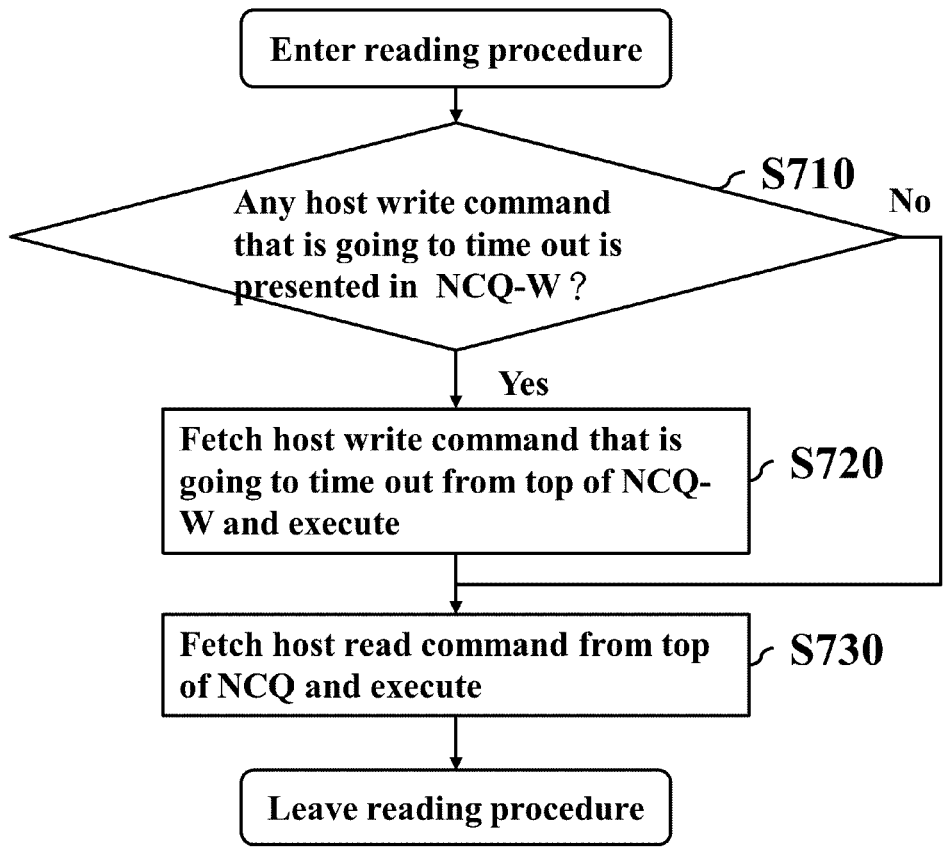
FIG. 7 is a flowchart illustrating a method for a reading procedure according to an embodiment of the invention.

Step S550: The reading procedure is entered. Technical details of the reading procedure will be described in the following paragraphs accompanying with FIG. 7. It is noted that when the execution leaves the reading procedure, it will return to the writing procedure to proceed to step S560.

Step S560: The host write command(s) that do not exceed the preset number is/are fetched from the top of the NCQ-W 400 and executed. Refer to FIG. 2. In order to optimize the programming operations of user data into the flash module 150, for example, the processing unit 134 may divide the user data into segments in a fixed length, such as 16K bytes, which is instructed to be written by the fetched host write commands, and drive the flash I/F 139 to program the segmented user data into the activated NAND flash units through the channels CH #0 to CH #3 in parallel. Subsequently, the processing unit 134 may drive the host I/F 131 to reply to the host side 110 with a message indicating that the fetched host write commands have been executed completely.

Step S570: It is determined whether all host write commands in the NCQ-W 400 have been executed completely. If so, the process leaves the writing procedure; otherwise, the process proceeds to step S510.

Figure 6:
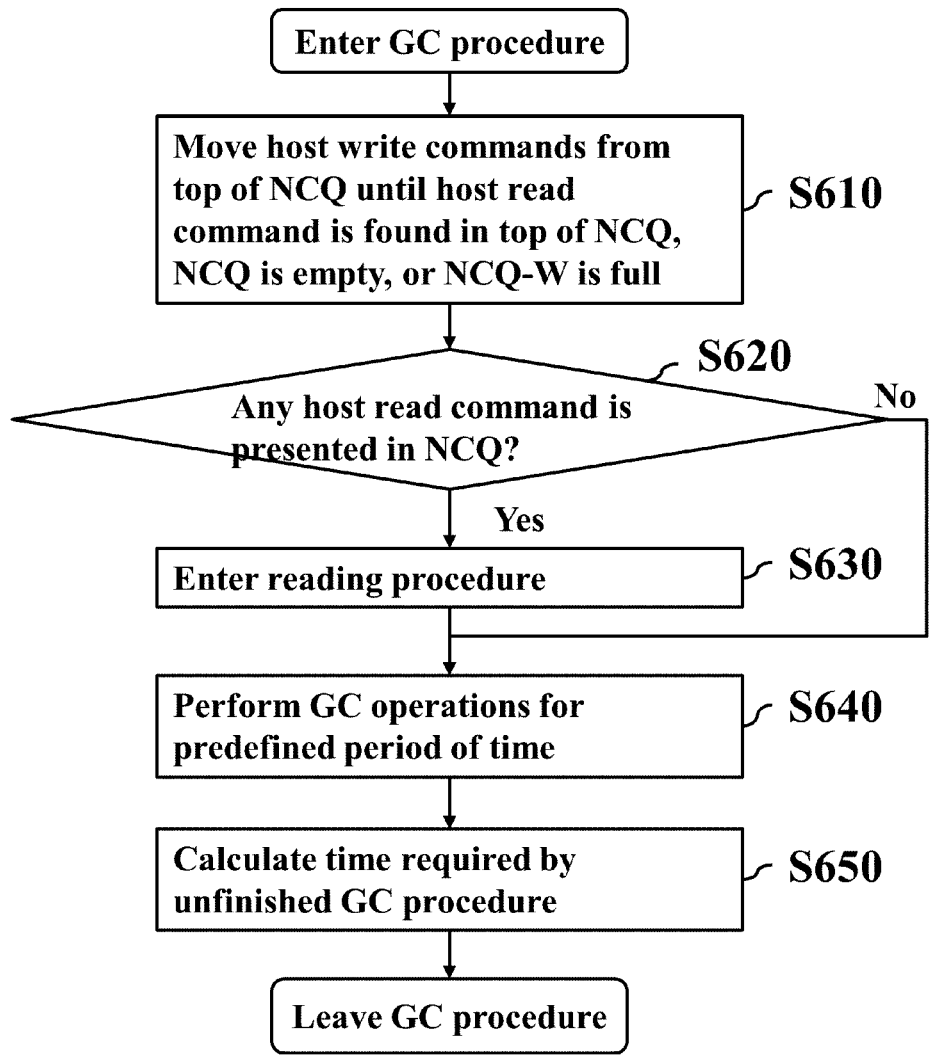
FIG. 6 is a flowchart illustrating a method for a garbage collection procedure according to an embodiment of the invention.

Refer to FIG. 6. In order to implement the aforementioned scheduling mechanism, an embodiment of the invention introduces a GC procedure performed by the processing unit 134 when loading and executing relevant firmware and/or software instructions. The processing unit 134 performs the GC procedure in batches to avoid timeout of execution of the host write commands resulting from excessively long time for performing the entire GC procedure. In each section, if any host read command is presented at the top of NCQ 300, the processing unit 134 executes the host read command first, and then performs GC operations for a predefined period of time. It is to be noted that the GC procedure is not only triggered in the writing procedure, but also triggered by the processing unit 134 when performing a background procedure for the optimization purpose. Detailed steps are described as follows:

Step S610: One or more host write commands are moved from the top of the NCQ 300 to the NCQ-W 400 until a host read command is found at the top of NCQ 300, the NCQ 300 is empty, or the NCQ-W 400 is full. Technical details may refer to the description of step S530 and are omitted herein for brevity.

Step S620: It is determined whether any host read command is presented in the NCQ 300. If so, the process proceeds to step S630; otherwise, the process proceeds to step S640.

Step S630: The reading procedure is entered. Technical details of the reading procedure will be described in the following paragraphs accompanying with FIG. 7. It is noted that when the execution leaves the reading procedure, it will return to the GC procedure to proceed to step S640.

Step S640: The GC operations are performed for a predefined period of time.

Step S650: The time required to complete the GC procedure is calculated. The processing unit 134 may update the public variable in the RAM 136 to indicate the time that is required for the unfinished GC procedure for reference by the other procedures.

It can be seen through the methods as shown in FIGS. 5 and 6 that when any host read command is presented in the NCQ 300, both the writing and the GC procedures need to be suspended to allow the host read command to execute first. However, the flash controller 130 also needs to ensure that each host write command does not time out. Otherwise, the host side 110 may consider that the host write command previously sent to the flash controller 130 has timed out and take certain error recovery actions, such as resending the host write command, etc.

To avoid the problems as described above, refer to FIG. 7. An embodiment of the invention introduces a reading procedure performed by the processing unit 134 when loading and executing relevant firmware and/or software instructions. Detailed steps are described as follows:

Step S710: It is determined whether any host write command that is going to time out is presented in the NCQ-W 400. If so, the process proceeds to step S720; otherwise, the process proceeds to step S730. Each host write command when entering the NCQ 300 is given with a timestamp to record the time point when the host write command enters the flash controller 130. The processing unit 134 may determine whether the time has elapsed from the time point indicated by the timestamp with the host write command at the top of the NCQ-W 400 is greater than the preset threshold. If so, the host write command at the top of the NCQ-W 400 is going to time out.

Step S720: The host write commands that are going to time out are fetched from the top of the NCQ-W and executed. The processing unit 134 may execute a loop to repeatedly collect the host write commands from the top of the NCQ-W 400 until no host write command that is going to time out is presented in the NCQ-W 400, or the NCQ-W 400 is empty. Refer to FIG. 2. In order to optimize the programming operations of user data into the flash module 150, for example, the processing unit 134 may divide the user data into segments in a fixed length, such as 16K bytes, which is instructed to be written by the collected host write commands, and drive the flash I/F 139 to program the segmented user data into the activated NAND flash units through the channels CH #0 to CH #3 in parallel. Subsequently, the processing unit 134 may drive the host I/F 131 to reply to the host side 110 with a message indicating that the collected host write commands have been executed completely.

Step S730: The host read commands are fetched from the top of the NCQ 300 and executed. The processing unit 134 may execute a loop to repeatedly collect the host read commands from the top of the NCQ 300 until no host read command is presented in the NCQ 300, or the NCQ 300 is empty. In each iteration, the processing unit 134 may obtain a logical address (such as a Logical Block Address, LBA) indicated in the host read command, obtain a physical address that user data of the logical address is physically stored in by searching the Logical-to-Physical mapping (L2P) table. Subsequently, the processing unit 134 may drive the flash I/F 139 to read user data from the physical address of the flash module 150 and drive the host I/F 131 to reply to the host side 110 with the read user data.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged to operably perform the aforementioned operations. While the process flows described in FIGS. 5 to 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer program product for scheduling execution of host commands when executed by a processing unit of a flash controller, wherein space of a random access memory of the flash controller is allocated for a first queue and a second queue, and the first queue stores the host commands issued by a host side in an order of time when the host commands arrive to the flash controller, the non-transitory computer program product comprising program code to:
   migrate one or more host write commands from the top of the first queue to the second queue in an order of time when the host write commands arrive to the flash controller until the top of the first queue stores a host read command;
   fetch the host read command from the top of the first queue;
   execute the host read command to read user data from a flash module; and
   reply to the host side with the user data.

2. The non-transitory computer program product of claim 1, comprising program code to:
   determine whether any host write command that is going to time out is presented in the second queue before the host read command is fetched; and
   fetch the host write command/commands that is/are going to time out from the second queue and execute the fetched host write command/commands when any host write command that is going to time out is presented in the second queue,
   wherein the time has elapsed from a time point indicated by a timestamp with each host write command that is going to time out is greater than a threshold.

3. The non-transitory computer program product of claim 1, comprising program code to:
   perform garbage collection (GC) operations for a period of time to collect fragmentary valid user data stored in a plurality of physical blocks of the flash module and program the collected user data into one or more new physical blocks of the flash module after the host read command is executed.

4. The non-transitory computer program product of claim 1, comprising program code to:
   fetch the host write commands from the top of the second queue after performing garbage collection (GC) operations for a period of time; and
   execute the host write commands,
   wherein the GC operations collect fragmentary valid user data stored in a plurality of physical blocks of the flash module and program the collected user data into one or more new physical blocks of the flash module.

5. The non-transitory computer program product of claim 1, wherein a depth of the second queue is shorter than a depth of the first queue.

6. The non-transitory computer program product of claim 1, wherein the second queue is configured to store host write commands for requesting the flash controller to program user data into the flash module only.

7. The non-transitory computer program product of claim 1, wherein the host write commands are migrated from the top of the first queue to the second queue during a writing procedure for programming user data into the flash module.

8. The non-transitory computer program product of claim 1, wherein the host write commands are migrated from the top of the first queue to the second queue during a garbage collection (GC) procedure for collecting fragmentary valid user data stored in a plurality of physical blocks of the flash module and programing the collected user data into one or more new physical blocks of the flash module.

9. A method for scheduling executions of host commands, performed by a flash controller, wherein space of a random access memory of the flash controller is allocated for a first queue and a second queue, and the first queue stores the host commands issued by a host side in an order of time when the host commands arrive to the flash controller, the method comprising:
   migrating one or more host write commands from the top of the first queue to the second queue in an order of time when the host write commands arrive to the flash controller until the top of the first queue stores a host read command;
   fetching the host read command from the top of the first queue;
   executing the host read command to read user data from a flash module; and
   replying to the host side with the user data.

10. The method of claim 9, comprising:
    determining whether any host write command that is going to time out is presented in the second queue before the host read command is fetched; and
    fetching the host write command/commands that is/are going to time out from the second queue and executing the fetched host write command/commands when any host write command that is going to time out is presented in the second queue,
    wherein the time has elapsed from a time point indicated by a timestamp with each host write command that is going to time out is greater than a threshold.

11. The method of claim 9, comprising:
    performing garbage collection (GC) operations for a period of time to collect fragmentary valid user data stored in a plurality of physical blocks of the flash module and program the collected user data into one or more new physical blocks of the flash module after the host read command is executed.

12. The method of claim 9, comprising:
    fetching the host write commands from the top of the second queue after performing garbage collection (GC) operations for a period of time; and
    executing the host write commands,
    wherein the GC operations collect fragmentary valid user data stored in a plurality of physical blocks of the flash module and program the collected user data into one or more new physical blocks of the flash module.

13. An apparatus for scheduling executions of host commands, comprising:
    a random access memory (RAM), arranged operably to allocate space for a first queue and a second queue, wherein the first queue stores the host commands issued by a host side in an order of time when the host commands arrive to a flash controller;

a flash interface (I/F), coupled to a flash module;

a host I/F, coupled to the host side; and a processing unit, coupled to the RAM, the flash I/F and the host I/F, arranged operably to migrate one or more host write commands from the top of the first queue to the second queue in an order of time when the host write commands arrive to the flash controller until the top of the first queue stores a host read command; fetch the host read command from the top of the first queue; execute the host read command to drive the flash I/F to read user data from the flash module; and drive the host I/F to reply to the host side with the read user data.

14. The apparatus of claim 13, wherein the processing unit is arranged operably to determine whether any host write command that is going to time out is presented in the second queue before the host read command is fetched; and fetch the host write command/commands that is/are going to time out from the second queue and execute the fetched host write command/commands to drive the flash I/F to program designated user data into the flash module when any host write command that is going to time out is presented in the second queue.

15. The apparatus of claim 14, wherein the time has elapsed from a time point indicated by a timestamp with each host write command that is going to time out is greater than a threshold.

16. The apparatus of claim 13, wherein the processing unit is arranged operably to perform garbage collection (GC) operations for a period of time to drive the flash I/F to collect fragmentary valid user data stored in a plurality of physical blocks of the flash module and program the collected user data into one or more new physical blocks of the flash module after the host read command is executed.

17. The apparatus of claim 13, wherein the processing unit is arranged operably to fetch the host write commands from the top of the second queue after performing garbage collection (GC) operations for a period of time; and execute the host write commands to drive the flash I/F to program designated user data into the flash module, wherein the GC operations collect fragmentary valid user data stored in a plurality of physical blocks of the flash module and program the collected user data into one or more new physical blocks of the flash module.

18. The apparatus of claim 13, wherein the second queue is configured to store host write commands for requesting the flash controller to program user data into the flash module only.

19. The apparatus of claim 13, wherein the host write commands are migrated from the top of the first queue to the second queue during a writing procedure for programming user data into the flash module.

20. The apparatus of claim 13, wherein the host write commands are migrated from the top of the first queue to the second queue during a garbage collection (GC) procedure for collecting fragmentary valid user data stored in a plurality of physical blocks of the flash module and programing the collected user data into one or more new physical blocks of the flash module.

* * * * *